A. V. ROWE.
RUBBING DEVICE FOR ANIMALS.
APPLICATION FILED JULY 24, 1914.

1,319,362.

Patented Oct. 21, 1919.
2 SHEETS—SHEET 1.

Witnesses:
O. W. Copeland
J. M. Anderson

Inventor
Alvin V. Rowe
by LaPorte & Bean
Attorneys.

A. V. ROWE.
RUBBING DEVICE FOR ANIMALS.
APPLICATION FILED JULY 24, 1914.
1,319,362.
Patented Oct. 21, 1919.
2 SHEETS—SHEET 2.
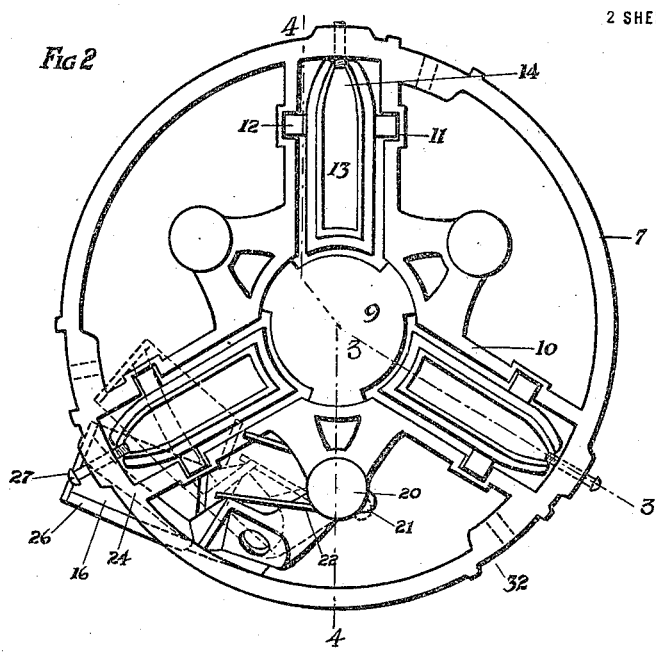
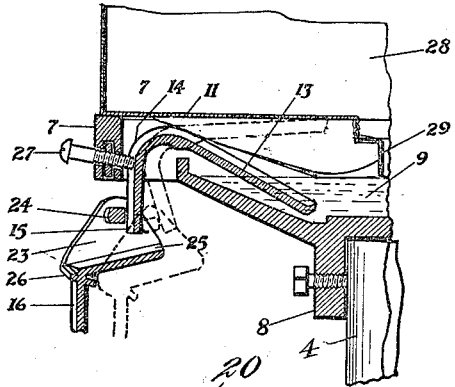
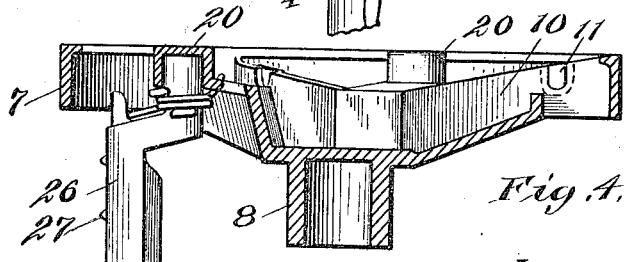
Witnesses:
P. M. Copeland
J. M. Anderson
Inventor
Alvin V. Rowe
by LaForte & Bean
Attorneys

UNITED STATES PATENT OFFICE.

ALVIN V. ROWE, OF GALESBURG, ILLINOIS.

RUBBING DEVICE FOR ANIMALS.

1,319,362.  Specification of Letters Patent.  Patented Oct. 21, 1919.

Application filed July 24, 1914. Serial No. 852,905.

*To all whom it may concern:*

Be it known that I, ALVIN V. ROWE, a citizen of the United States, a resident of Galesburg, in the county of Knox and State of Illinois, have invented new and useful Improvements in Rubbing Devices for Animals, of which the following is a specification.

My invention relates to improvements in rubbing devices for animals, such as hogs and the like, and the object of the invention is to provide a device which is simple in construction and efficient in operation and results in the application of oil or grease to the sides and back and body of the animal by rubbing action of the animal itself.

A further object of the invention is the provision of such a device having means whereby the animal may rub against a movable member and cause a small amount of the oil or grease to be distributed over said member so as to be applied to some parts of his body.

A further object of the invention is the provision of such a device including a plurality of rubbing members, each operatively connected to a pivoted member which is adapted to lift a small portion of oil or grease from a source of supply and distribute the same to the rubbing member, so that when the rubbing member is actuated by the hog or other animal, oil or grease will be applied thereto.

To the accomplishment of the foregoing and such other objects as may hereinafter appear, my invention consists in the combination, construction and arrangement of parts hereinafter described, and then sought to be defined in the appended claims, reference being had to the accompanying drawings forming a part hereof and which show merely for the purpose of illustrative disclosure, a preferred embodiment of my invention, it being understood that various changes may be made in practice within the scope of the claims, without digressing from my inventive idea.

In the drawings, Figure 1 represents a device constructed according to my invention, in side elevation;

Fig. 2 is a plan view of the device with the supply can or receptacle removed, parts being shown in dotted lines for the purpose of illustrating the operation;

Fig. 3 represents a section through the upper part of the device, taken on the line 3—3 of Fig. 2 showing the well and the distributing members or spoons and the rubbing parts, parts being shown in dotted line position for clear disclosure of the operation.

Fig. 4 represents a cross section through the well portion of the device, taken substantially on line 4—4 of Fig. 2.

Figure 1:
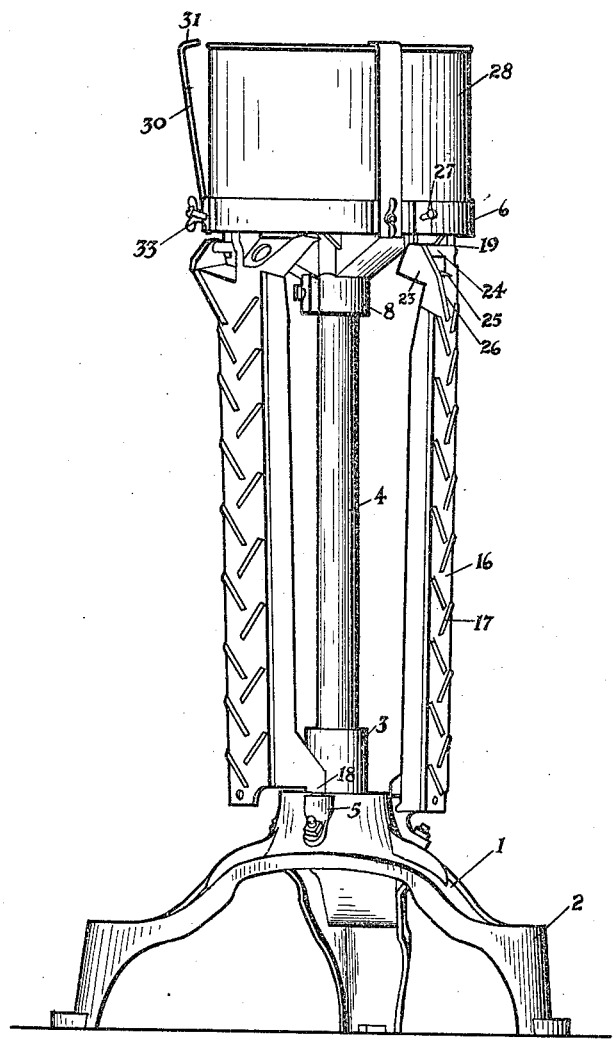

It is found in practice, that the various kinds of rubbing devices for hogs and other animals on the market are faulty for various reasons, the same being that a hog may lean against the device and cause a continual discharge of the oil or grease, other disadvantages arising from the use of valves so that any dirt or sediment in the oil or grease or other dirt will clog the same and prevent the proper operation of the device.

My invention provides a device by which the animal can only apply a small amount of the oil or grease at a time to himself, so that a considerable saving of the oil or grease is effected, and further, my device eliminates the use of valves of any sort so that any trouble through them is done away with.

Referring now to the drawings, it is seen that a device constructed according to my invention comprises the base 1 which is provided with a plurality of supports or legs 2 and has the socket 3 thereon to receive the supporting post or member 4. This provides a support or base as specified in the claims on which the operating parts are supported. This base member also has the socket members 5 detachably secured thereto, as shown, for the purpose of receiving the lower pintles of the rubbing members, as will be described later.

On the upper end of the supporting post or member 4 is mounted the casting 6 which is circular in general shape, having the outer ring 7 and the central socket 8 to receive the upper end of the support 4. This socket 8 also provides the bottom of a well portion 9 which has the channels 10 radiating therefrom; the bottoms of which incline upwardly as shown. Mounted in recesses 11 in the sides of these channels 10 by means of the pintles 12, are the distributing members or spoons 13 which take the form of a channel member lying within the channels 10 and have their outer ends reduced and turned downwardly at an angle as at 14, to provide an engaging extension 15 for the rubbing member 16. It is to be noted that the manner of mounting these distributing members 13 provides a pivotal connection, whereby they may be tilted; this pivotal connection permitting of ready removal of the distributing members in case of necessity. The reducing of the end portion of each distributing member also reduces the area of the channel so that the oil or other liquid supplied thereby is discharged in a comparatively thin stream on to the rubbing member, so that it is directed by the ribs, subsequently described, on the face thereof. These distributing members or spoons 13 serve to transfer the liquid from the well portion to the rubbing member and are normally adapted to lie in a non-discharging position, being actuated by the rubbing members, as hereinafter described, to a discharging position and thereby transferring a limited quantity of the liquid from the well portion to the rubbing member.

This rubbing member 16 is in the form of an elongated plate, substantially rectangular in shape and having staggered and converging ribs 17 formed on the outer face thereof. This member has the pintle 18 at its lower end journaled in the socket member 5, previously mentioned, and also has the pintle member 19 at its upper end journaled in the socket member 20 forming part of the casting 6 previously described. It is to be noted that the pintles 18 and 19 are provided on one edge or side of each rubbing member so that it swings on vertical pivots in a horizontal direction in the manner of a door or shutter. Each pintle 19 has the lugs 21 extending therefrom, which lugs receive between them, part of the spring 22 which spring engages the rubbing member 16 and the casting 6 at a point on top of one of the channel members 10 so as to normally hold the rubbing member in its outermost position. Each rubbing member is provided with the lateral extension 23 having a bar 24 adapted to engage the operating extension 15 of the distributing member or spoon 13 and below the bar is provided a downwardly inclined member 25 which is provided with the downwardly extending flange 26 to feed the oil or grease on to the face of the rubbing member as previously described. The bolt and nut connection 27 is for the purpose of bearing against the operating extension 15 of the member 13 for the purpose of adjusting its position relative to the reservoir 9 so as to determine the amount of oil or grease that is picked up at each operation thereof.

It is therefore to be seen that when the hog or other animal leans against the rubbing member or bar, that he pushes the same inwardly against the tension of the spring, and thereby causes the bar 24 to engage the operating extension or toe 15 of the distributing member or spoon 13 and tilt said member so that the oil or grease which rests in said member will be transferred or discharged outwardly on to the inclined member 25 and directed by the flange 26 on to the face of the rubbing member 16.

In order to supply the oil or grease, I provide the receptacle 28 which has the discharge spout 29 resting within the well portion 9, this receptacle being held in place on the ring 7 by means of the clamps 30 which clamps have the inturned ends 31 and are held in place in the grooves or recesses 32 in the ring 7 by means of the bolt and nut connections 33, so that the receptacle may be readily removed and securely clamped in position.

It is to be noted that as the discharge nozzle from said receptacle extends within the well portion, that when the liquid therein reaches a certain height, the discharge will cease and that therefore the height of the liquid in the well portion 9 is maintained at a certain level, so that when the distributing members or spoons 13 operate, they are always picking up a small quantity of the liquid to distribute the same.

When the level of the oil in the well portion is below the end of the discharge spout of the receptacle 28, a small quantity of the liquid is discharged, due to the admission of air into the receptacle until the oil in the well portion covers the end of the spout so as to form the liquid seal.

It is to be noted that this device is composed of very few parts, being simple in construction, readily assembled and may be readily knocked down for convenience in shipping. No valves are necessary for the proper operation of the device and the provision of the distributing members or spoons and the arrangement whereby they must be positively actuated in order to discharge any of the oil or grease, prevents undue waste and expense. The provision of the securing of the receptacle, permits convenient filling of the receptacle and renewing the supply of the oil or grease used. The construction is so simple that the parts cannot readily get out of order and any repairs may be made with facility.

What I claim is:—

1. In a device of the character described and in combination, a base, a well portion supported thereon, a plurality of rubbing members pivoted on said base, a plurality of distributing members pivotally mounted and positioned in said well portion and adapted to be tilted to supply a small quantity of liquid from said well portion to said rubbing members, said rubbing members being adapted to actuate said distributing members so as to tilt the same.

2. In a device of the character described and in combination, a base, a well portion thereon, rubbing members pivotally mounted on said base, distributing members pivotally mounted and being of channel cross section and positioned in said well portion, said distributing members being adapted to be tilted to supply a small quantity of liquid from said well portion to said rubbing members, said distributing members each having a depending extension adapted to be engaged by one of said rubbing members so as to tilt said distributing members.

3. In a device of the character described, and in combination, a base, a well portion thereon, rubbing members pivotally mounted on said base, distributing members pivotally mounted and being of channel cross section and positioned in said well portion, said distributing members being adapted to be tilted to supply a small quantity of liquid from said well portion to said rubbing members, said distributing members each having a depending extension adapted to be engaged by one of said rubbing members so as to tilt said distributing members, resilient means for normally holding the rubbing members in their outermost position, and means for adjusting the position of said distributing members.

4. In a device of the character described and in combination, a base, a supporting post mounted thereon, a casting mounted on top of said post and providing a well portion, a supply receptacle mounted on said casting to discharge into said well portion, a plurality of rubbing members pivoted to said base and said casting, said casting having channels radiating from said well portion, a distributing member positioned in each channel and pivotally mounted so as to be capable of being tilted to supply a small quantity of liquid from said well portion to said rubbing member, said distributing members adapted to be engaged and actuated by said rubbing members.

5. In a device of the character described and in combination, a base, a supporting post mounted thereon, a casting mounted on top of said post and provided with a well portion, a supply receptacle mounted on said casting to discharge into said well portion, a plurality of rubbing members pivoted to said base and said casting, said casting having channels radiating from said well portion, a distributing member positioned in each channel and pivotally mounted so as to be capable of being tilted to supply a small quantity of liquid from said well portion to said rubbing member, said distributing members adapted to be actuated by said rubbing members, said distributing members being channel shaped in cross-section and each having a depending extension adapted to be engaged by said rubbing members.

6. In a device of the character described and in combination, a base, a supporting post mounted thereon, a casting mounted on top of said post and provided with a well and a ring portion, a plurality of rubbing members pivoted to said base and said casting, said casting having channels radiating from said well portion, a distributing member positioned in each channel and pivotally mounted so as to be capable of being tilted to supply a small quantity of liquid from said well portion to said rubbing member, said distributing members adapted to be actuated by said rubbing members, a supply receptacle supported on the ring portion of said casting and having a discharge nozzle positioned in said well portion whereby a certain level of the liquid is maintained.

7. In a device of the character described and in combination, a base, a well portion thereon, rubbing members pivoted thereto, distributing members pivotally mounted and having portions positioned in said well portion, said distributing members each having a depending extension, said rubbing members each having a lateral extension and also a member adapted to engage said depending extension on said distributing members, said lateral extension having an inclined face adapted to receive the liquid from the distributing members when the same are tilted by the actuation of the rubbing members and to direct the liquid on to the face of the rubbing members.

8. In a device of the character described and in combination, a base, a well portion thereon, a plurality of rubbing members adapted to receive a liquid from said well portion, means for supplying a limited quantity of said liquid to said rubbing members on the actuation thereof by an animal, a supply receptacle supported on said base and having a discharge spout positioned in said well portion and so arranged as to supply liquid to the well portion in proper quantities, the oil in the well portion providing a liquid seal for the end of the spout when it reaches a certain height.

9. A device of the character described, including in combination, a base having a well portion, a source of oil supply thereon, a rubbing member mounted to move relative to said base, a distributing member pivotally mounted on said base and having a portion positioned in said well portion, connections between said rubbing member and said distributing member, whereby when said rubbing member is moved by the pressure of an animal thereagainst, said distributing member will supply a small quantity of liquid from said well portion to said rubbing member.

10. A device of the character described, including in combination, a base, a well portion, a source of oil supply thereon, rubbing members mounted to move relative to said base, distributing members pivotally mounted on said base and having portions positioned in said well portion, connections between said rubbing members and said distributing members, whereby when said rubbing members are moved by the pressure of an animal thereagainst, said distributing members will supply a small quantity of liquid from said well portion to said rubbing members, and means for adjusting the relative position of said distributing members.

11. In a device of the character described and in combination, a base, a well portion, rubbing members pivoted on said base and distributing members, said distributing members having pintles on each side thereof to provide a loose pivotal mounting and being positioned in said well portion and adapted to be tilted to supply a small quantity of liquid from said well portion to said rubbing members, said rubbing members being adapted to actuate said distributing members so as to tilt the same.

12. In a device of the character described and in combination, a base, a well portion thereon, rubbing members pivotally mounted on said base, distributing members pivotally mounted and being of channel cross section and positioned in said well portion, the discharge end of said distributing members being reduced so as to provide a restricted discharge channel, said distributing members being adapted to be tilted to supply a small quantity of liquid from said well portion to said rubbing members, said rubbing members being adapted to actuate said distributing members so as to tilt the same.

13. In a device of the character described and in combination, a supporting means having a source of liquid supply thereon, a rubbing member mounted to move on said supporting means and a transfer member adapted to transfer liquid in limited quantities from said source of supply to said rubbing member, said transfer member being normally in a non-discharge position and being actuated by said rubbing member to assume a discharge position.

14. In a device of the character described and in combination, a supporting means having a source of liquid supply thereon, a rubbing member mounted to move on said supporting means, a transfer member mounted to tilt on said supporting means and arranged to supply liquid in limited quantities from said source of supply to said rubbing member, said transfer member being normally in a non-discharge position and being adapted to be engaged by said rubbing member when actuated by an animal so as to be tilted to a discharge position.

15. A device of the character described including in combination, a supporting means having a source of oil supply thereon, a plurality of rubbing members having a vertical pivot at the end connecting it to said supporting means, a plurality of transfer members adapted to supply liquid in limited quantities from said source of supply to said rubbing members, said rubbing members being adapted to engage said transfer members to move them from a non-discharge position to a discharge position.

16. A device of the character described including in combination, a support, a supply reservoir mounted thereon, a well portion for receiving liquid from said reservoir, a plurality of rubbing members pivotally mounted on said support, dipper members positioned in said well, and connections between said rubbing members and said dipper members, whereby when pressure is applied to said rubbing members, the dipper members will discharge a quantity of liquid on said rubbing members.

17. A device of the character described, including in combination, a supporting means having a source of oil supply thereon, a rubbing member movably mounted on said support, a dipper member pivoted on said supporting means at its upper end and adapted to be engaged by said rubbing member to transfer a limited quantity of liquid from said source of supply to said rubbing member.

18. A device of the character described, including in combination, a supporting means having a source of oil supply thereon, a rubbing member movably mounted on said support, a dipper member pivoted on said supporting means at its upper end and adapted to be engaged by said rubbing member to transfer a limited quantity of liquid from said source of supply to said rubbing member.

19. In combination, a standard, a liquid reservoir thereon, a ladle normally held within said reservoir, and a push bar held by said standard and contacting with said ladle whereby said ladle is raised and emptied when said push bar is actuated.

20. In a device of the character described, a standard, a reservoir, a ladle normally held within said reservoir, a push bar movably held by said standard and contacting with said ladle, whereby said ladle is raised when said push bar is actuated, and means for limiting the upward movement of said ladle.

21. In combination, a standard, a reservoir, a ladle normally held within said reservoir, means limiting the downward movement of said ladle, and a push bar held by said standard and contacting with said ladle whereby said ladle is raised when said push bar is actuated.

22. In combination, a standard, a reservoir, a ladle normally held within said reservoir, means limiting the downward movement of said ladle, a push bar held by said standard and contacting with said ladle whereby said ladle is raised when said push bar is actuated, and means limiting the upward movement of said ladle.

23. In combination, a standard, a reservoir, a ladle normally held within said reservoir, a tank emptying into said reservoir, and a push bar pivotally held by said standard and contacting with said ladle whereby said ladle is raised and emptied when said push bar is actuated.

24. In combination, a standard, a reservoir, a ladle normally held within said reservoir, a push bar held by said standard and contacting with said ladle whereby said ladle is raised and emptied when said push bar is actuated, and means for limiting the upward movement of said ladle.

25. In an apparatus for the purpose set forth, the combination of a receptacle for liquid, and a liquid-feeding device comprising members arranged to straddle an edge of the receptacle, one member constituting a liquid-moving instrumentality and another member being located outside the receptacle and constituting a rubbing bar and arranged to receive liquid from the receptacle.

ALVIN V. ROWE.

Witnesses:
U. V. BLYTHE,
L. W. SPARKS.

Copies of this patent may be obtained for five cents each, by addressing the "Commissioner of Patents, Washington, D. C."